United States Patent [19]

Yamazaki et al.

[11] Patent Number: 4,861,143

[45] Date of Patent: Aug. 29, 1989

[54] LIQUID CRYSTAL DISPLAY CAPABLE OF DISPLAYING GRAY TONE

[75] Inventors: Shunpei Yamazaki, Tokyo; Takashi Inujima, Atsugi; Toshimitsu Konuma, Atsugi; Toshiji Hamatani, Atsugi; Akira Mase, Atsugi; Mitsunori Sakama, Hiratsuka; Minoru Miyazaki, Atsugi; Kaoru Koyanagi, Saku; Toshiharu Yamaguchi, Zama, all of Japan

[73] Assignee: Semiconductor Energy Laboratory Co., Ltd., Kanagawa, Japan

[21] Appl. No.: 127,433

[22] Filed: Dec. 2, 1987

Related U.S. Application Data

[62] Division of Ser. No. 895,029, Aug. 8, 1986, abandoned.

[30] Foreign Application Priority Data

Aug. 8, 1985 [JP] Japan .................................. 60-175193

[51] Int. Cl.⁴ .................................................. G02F 1/13
[52] U.S. Cl. .................................. 350/350 S; 350/341; 350/339 R
[58] Field of Search ............ 350/350 S, 339 R, 339 F, 350/341

[56] References Cited

U.S. PATENT DOCUMENTS

| | | | |
|---|---|---|---|
| 4,634,228 | 1/1987 | Iwasaki et al. | 350/350 S |
| 4,648,691 | 3/1987 | Oguchi et al. | 350/338 |
| 4,712,877 | 12/1987 | Okada et al. | 350/350 S |
| 4,725,129 | 2/1988 | Kondo et al. | 350/350 S |
| 4,765,720 | 8/1988 | Toyono et al. | 350/350 S |
| 4,796,980 | 1/1989 | Kaneko et al. | 350/350 S |

OTHER PUBLICATIONS

Yoshino et al. "New Electro Optical Effects in Ferroelectric Liquid Crystal", Appl. Phys., vol. 18 supplement 18-1, pp. 427-433, 1979.
Pelzl et al., Mol. Cryst. Liq. Cryst., vol. 53, pp. 167-180, 1979.

Primary Examiner—Stanley D. Miller
Assistant Examiner—Huy Kim Mai
Attorney, Agent, or Firm—Gerald J. Ferguson, Jr.

[57] ABSTRACT

A liquid crystal display of the chiral smectic type is caused to have grey scales, by applying a voltage of an intermediate level to the liquid crystal. Within each picture element of the display, there are a number of domains of the liquid crystal layer, some being transparent while the other being opaque rendering grey tone to the picture element.

4 Claims, 4 Drawing Sheets

LIQUID CRYSTAL DISPLAY CAPABLE OF DISPLAYING GRAY TONE

This application is a division of Ser. No. 895,029, filed 8/8/86, now abandoned.

BACKGROUND OF THE INVENTION

1. Field of the Invention

This invention relates to a liquid crystal appliance, more paticularly to a display having variable density.

2. Prior Art of the Invention

Liquid crystals have been in use in a variety of displays for electrical appliances, in particular for those requiring compactness, energy efficiency, such as displays of micro computers, word processors, televisions or the like.

In such a display, a system which controls each picture element respectively is efficient. Prior to the invention, twisted nematic liquid crystal was emloyed for an A4 size display which contains 400 elements x 200 elements controlled according to multiplex system. The display assembly, however, has responsibility to high frequency input only of a the order of millisecond or less. Therefore the number of picture elements is limited to about 640 x400 elements or less. In practice, it is impossible to display grey tone which is indispensible for making a color display.

SUMMARY OF THE INVENTION

It is therefore an object of the invention to provide a liquid crystal display capable of displaying grey tone.

It is another object of the invention to provide a liquid crystal display in which a liquid crystal layer of a picture element exhibits a diverse grade of transmissivity.

BRIEF DESCRIPTION OF THE INVENTION

Figure 1:
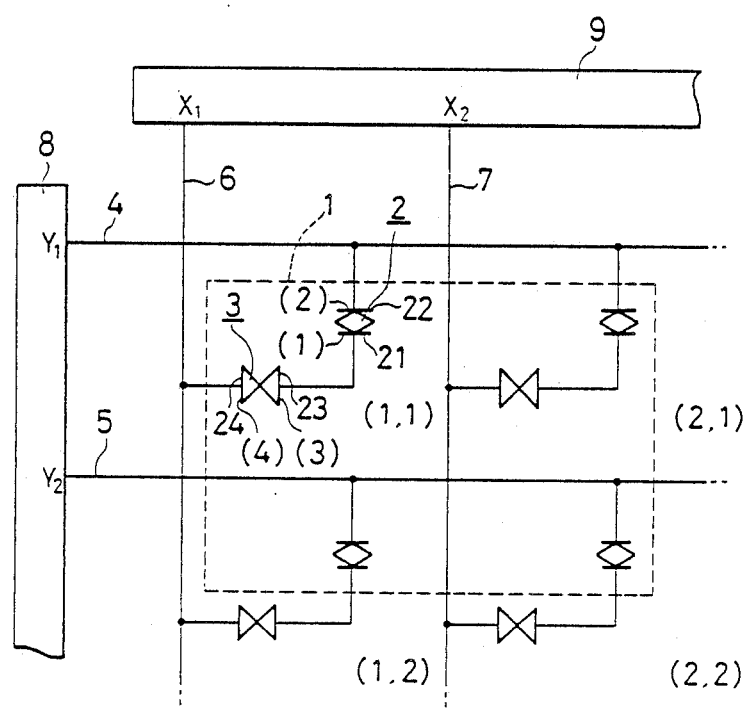
FIG. 1 is a block diagram of a matrix circuitry of an liquid display driving curcuitry.
Figure 2A:
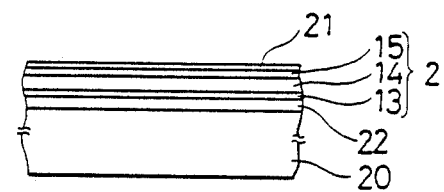
FIGS. 2(A) through 2(D) are section views showing the manufacturing process of an embodiment of the invention.
Figure 2B:
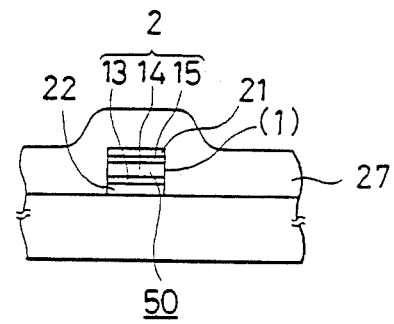
Figure 2C:
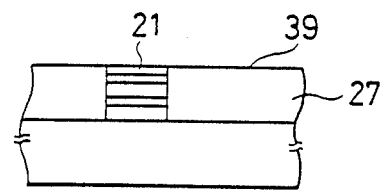
Figure 2D:
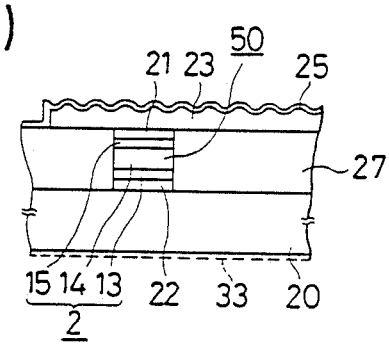

According to the invention, liquid crystal of smectic chiral C phase is used which exhibits birefringence. The liquid crystal is rendered to have a number of domains within one picture element. Preferably the number of domains is more than $10^2$. Each picture element is controlled to take a transparent condition or opaque condition selectively by applying a forward or reverse electric field of sufficient level between a pair of opposed electrodes in which the liquid crystal layer is disposed. The picture element contains a number of domains, some of which are in dark condition while others are in transparent condition under application of weak electric field, integrally appearing with grey tone as seen by native eyes. The mechanism of displaying the grey tone will be explained infra.

The liquid crystal layer is disposed with a certain molecular arrangement by inserting the same between the pair of the substrates at a somewhat high temperature so that the liquid crystal molecules are allowed to take the same attitude in a smectic A phase in virtue of an oriented surface of the substrate contiguous to the liquid crystal layer. When the temperature of the liquid crystal decreases to the room temperature, the liquid crystal becomes of smectic C phase in which the molecules are inclined at the characteristic tilted angle with respect to normal of the layer. The molecules having dipole moment are free to rotate about the layer normal with the fixed tilted angle, the rotation of the molecules being caused by applying electric field normal to the layer.

Namely the liquid crystal layer appears light-transmissive in response to a sufficient electric field of one sense and opaque in response to a sufficient electric field of the other sense, normal to the layer. This phenomenon can be observed with a hysteresis loop. In response to an intermediate voltage, the liquid crystal layer resides in an intermediate condition where some molecules favor the transparent condition and other molecules favor the opaque condition within one picture element. According to the invention, the intermediate condition is stabilized and realizes diverse grades of transmissivity by virtue of fluctuation of the distance between the opposed substrates within one picture element i.e. by virtue of fluctuation of electric field applied thereon. In other words, a picture element is sectioned into a plurality of domains having different threshold voltages.

The dipole moment density of one picture element is given by the equation, $$P = \Sigma SiPi / \Sigma Si$$

where Si is the area of the i-th domain in the picture element, and Pi is the dipole moment density of the i-th domain.

The above dipole density Pi can be assumed to make binary system. When a sufficient electric field is applied to the picture element, all the dipole moments are oriented in the same direction. When an intermediate electric field is applied to the picture element, the direction of some dipole moments is reversed into the opposite direction. The ratio of the opposed dipole moments determines the grade of the light-transmissivety.

To give stability to the intermediate state and ensure responsibility of the picture element to a certain level of applied field, an irregular pattern is formed on the inner surface of the substrate contiguous to the liquid crystal layer. The electric field is rendered fluctuated by the irregularity rendering in turn the domains diverse in threshold electric field.

DETAILED DESCRIPTION OF THE PREFERRED EMBODIMENT

Referring to FIG. 1, a circuitry diagram of an embodiment of the invention is shown. This embodiment is constituted by applying the invention to a liquid crystal display of an active type.

In the figure, the display circuitry comprises a matrix consisting of a number of picture elements ( 1,1 ), ( 1,2 ), ..., and ( 2,1 ), ( 2,2 ), ..., a column driver 9, and a row driver 8. The picture element ( 1,1 ) is composed of a scrad 2 connected to a $Y_1$ line 4 at its one terminal 22 and first and second electrodes 23 and 24 with one memory domain of liquid crystal 3 therebetween. The first electrode 23 is connected to the other terminal 21 while the second electrode 24 is connected to a $X_1$ line. Other picture elements follow suit. Needless to say, this configuration represents such an arrangement that an amount of liquid crystal is disposed between a pair of substrates, one being provided with the column lines $X_1, X_2, \ldots$, and the other being provided with the array lines $Y_1, Y_2, \ldots$, and the scrads 2 on the arrays respectively.

The picture elements can be seen in detail from FIGS. 2(A) through 2(D) and Figs.4(A) through 4(D). Figs.2(A) through (D) are sequential diagrams showing manufacturing steps for a part of the picture element of an embodiment of the invention.

A conductive layer 22 made of molybdenum is formed to 0.1–0.5 micron meter on a transparent insulating substrate 20 of corning 7059 glass by spattering or an electron beam deposition.

On the conductive layer 22, nonmonocrystaline semiconductors are grown to form a scrad comprising a n-type semiconductor layer 13 of 0.1 micron meter thick, a intrinsic semiconductor layer 14 of 0.3 micron meter thick and a n-type semiconductor layer 15 of 500 angstroms.

Next, chromium layer 21 is formed superimposed on the laminate to 0.1–0.2 micron meter by a spattering method or an electron beam deposition. The laminate thus formed is partially eliminated by an anisotropic plasma etching to construct laminated blocks having erected side walls (FIG .2(B)).

Further, throughout the principal surface of the substrate 20 on which the laminated block is provided, a photo-curable polyimide resin layer 27 is superimposed, followed by irradiation from the rear side of the substrate 20 with no mask to remove the bulge portion of the resin layer 27 on the laminated block.

Namely, the irradiation is carried out from the bottom side of the substrate 20 with the laminated block. In so doing, only the bulge portion above the laminated block is spared from being cured by virtue of locating behind the laminated block. The bulge portion not cured is removed by rinsing while the other developed remain as is. Accordingly, the flat surface with the electrode 21 of the scrad exposed results without resorting to the use of a photo mask. Then, the substrate is cured by heating in nitrogen atmosphere for 30 minutes at 180° C., for 30 minutes at 300° C. and thereafter for 30 minutes at 400° C.

Next, on the flat surface, reflective electrode 23 of ITO is deposited to an average thickness of 0.1–0.3 micron meter by spattering or an electron beam deposition. The condition of the deposition is chosen so that the height of the upper surface thereof fluctuates at about 0.2 micron meter deviation, rendering liquid crystal in the display assembled therewith to undergo relatively high electric field at a locus and relatively low electric field at another locus simultaneously. This fluctuation is similar to continuous ripples which in turn make an oriented film to be formed thereon uneven, eventually dividing the liquid crystal for one picture element into a plurality of domains. The ITO film is sectioned into a number of picture elements of 120 micron meters x 240 micron meters by selectively photo-etching with a photo mask (2). Further, on the sectioned film an organic film 25 such as silane coupling material is coated. The organic film is not treated with rubbing.

Figure 3A:
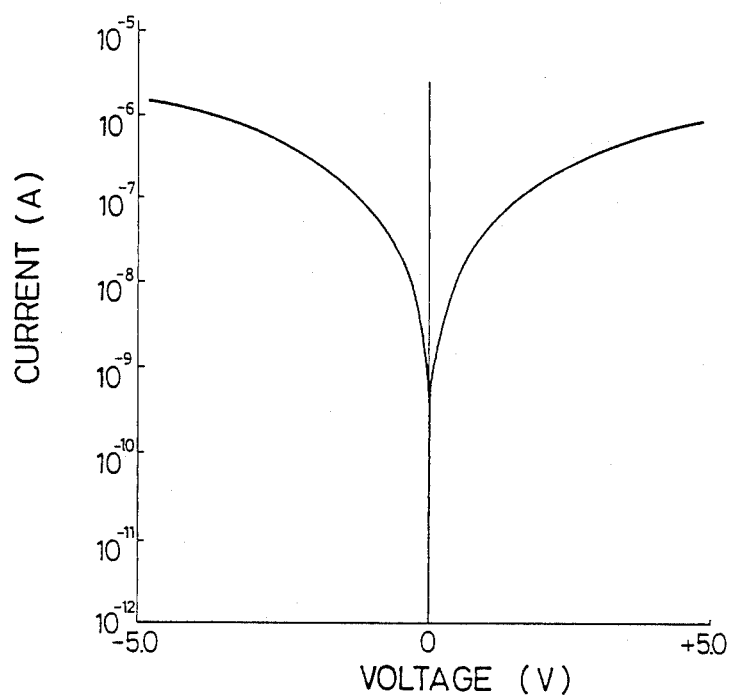
FIG. 3(A) is a graphical diagram showing the characteristic of a nonliner element used in the embodiment of the invention.

Thus, the first electrode 22, the scrad 2 and the second electrode 21 are built up as the laminated body with the third electrode 23 by only one alignment of two photo mask. FIG. 3(A) shows a nonliner characteristic of the scrad 2 with a pair of electrodes 21 and 22 of 120 micron meters x 420 micron meters.

Figure 4A:
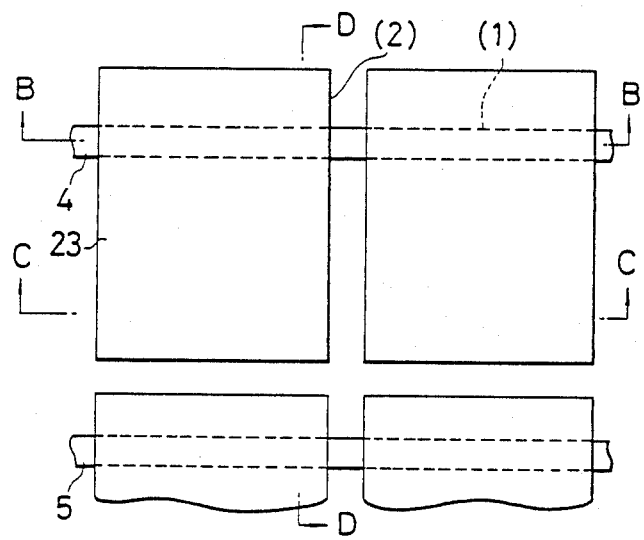
FIGS. 4(A) through 4(D) are a plan view and section views of an embodiment of the invention.
Figure 4D:
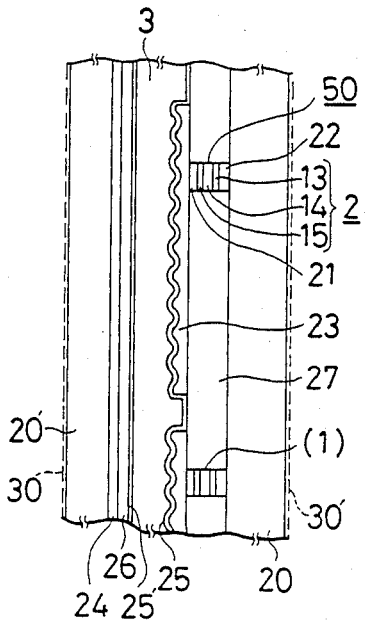
Figure 4B:
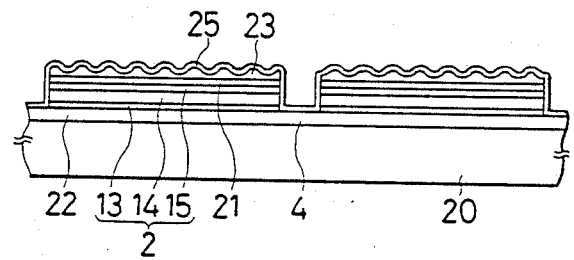
Figure 4C:
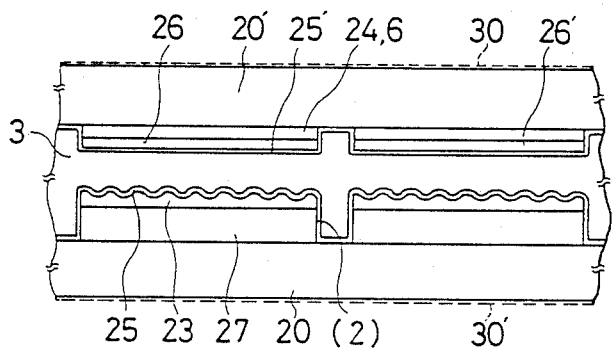

To constitute a necessary configuration for color display picture elements, an opposite substrate 20' is provided with the X lines and an opposite electrode 24 and at least one color filter 26 and 26' is selectively disposed on the inside of the electrode 23 or the electrode 24 as shown in Figs.4(C) and (D). The color filter is prepared corresponding to red, green and blue. On the color filter 26, an oriented film is coated to thickness of 0.1 micron meter by spinning method with polyacrylnitryl or polyvenylalcohol. Then the oriented film undergoes a known rubbing treatment. Namely, the film is moved at 2 meters/minute, rubbing on a nyron which is rotating at 900 RPM. On the other side which has irregular surface, a film made of silane coupling material is formed without rubbing.

Between the opposed substrate 20 and 20' an amount of ferroelectric liquid crystal is diposed, for example, prescribed by rlending S8 ( P-ochthyl-oxi-bendilidene-p'-amino-methyl-buthyl-benzoate ) and B8 ( 9-ochthyl-oxi-4'-biphenyl-colboneacide-2-methyl-buthyl-esthel ), or those as shown in Japanese Patent Disclosures No. sho59-98051, 118744, and 118745.

Figure 3B:
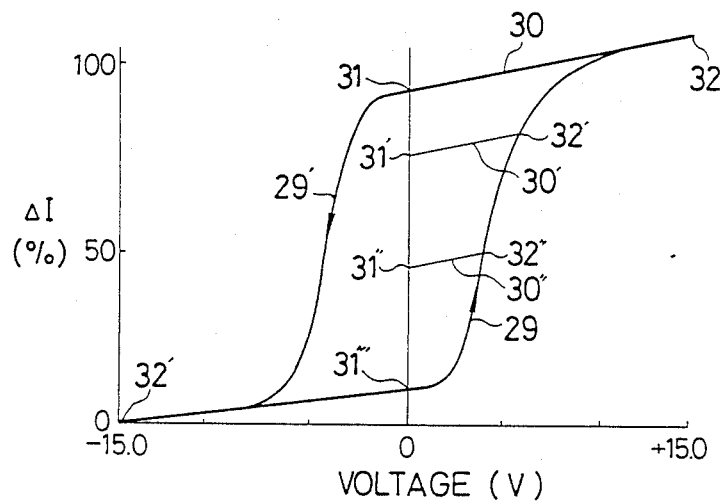
FIG. 3(B) is a graphical diagram showing the response of a picture element to input voltage according to the invention.

The graphical diagram of the transmissivity versus applied voltage of the picture elements is shown in FIG. 3(B). In the figure, a curve 29 is obtained when the voltage appied to the liquid crystal from 0 volt to 15 volt and a curve 30 is obtained when the voltage is decreased from 15 V to 0 V, holding transmissivity. The transmissivity is lost at a point 32' when the applied voltage changes from 0 V to −15V through a curve 29' and as well at a point 31''' when the applied voltage is removed.

According to the invention, the liquid crystal appears translucent 32' when 6 V is applied to the liquid crystal opaque in the condition corresponding to the point 31''. Further the liquid crystal becomes somewhat partially transparent when the applied voltage is increased to 10 V. In other words, any grade of grey color, e.g., dumm, translucent, partially transparent, or so on can be obtained by applying an appropriate voltage to the liquid crystal which is at the point 31''' after undergoing sufficient reverse voltage. Needless to say, the above discussion is true vise versa in terms of the direction of applied voltage. Namely, a negative voltage may be applied to the liquid crystal having experienced a sufficient level of applied voltage in order to exibit a grey tone.

The irregurality of the ITO film is achieved with polycrystalline layer growing when the pressure of working gas and deposition rate are adequately chosen for chemical vapor deposition (CVD).

Referring to FIGS. 4(A) through 4(D), detailed structure of the embodiment of the invention as encircled with a broken line in FIG. 1 is shown. In FIG. 4(A), 23 designates one picture element of the display. As shown from the figures, adjacent ones of the picture elements are partitioned by grooves with each area of 420 by 420 microns. On the inside of the transparent substrate 20' are formed the electrode 24, the X lines 6 and 7, color filters 26 and 26' and the oriented film 25'. On the upper side on which visible light is incident, a polarizer film 30 is provided.

While the present invention has been described with reference to a preferred embodiment thereof, many variations and modifications will now occur to those skiled in the art. It is our intent, therefore, to be limited solely by the scope of the appending claims and not by the specific embodiment disclosed herein.

What is claimed is:

1. A display device comprising:

a liquid crystal device including a transparent substrate, an opposed substrate, a smectic liquid crystal layer disposed between said substrates and a pair of electrodes formed on the both insides of said substrates in order to define a plurality of pixels, each said pixel of said liquid crystal device being provided with a corrugated inside surface contiguous to said liquid crystal layer so that a number of narrower liquid crystal layer regions and a number of wider liquid crystal layer regions are disposed over each pixel;

means for applying a first voltage to said pair of electrodes so that said liquid crystal device is made transparent inbetween;

means for applying a second voltage to said pair of electrodes so that said liquid crystal device is made opaque inbetween; and means for applying an intermediate voltage between said first and second voltages to said pair of electrodes so that each said pixel subjected to said intermediate voltage is provided with a grey scale tone.

2. The display of claim 1 including a plurality of pairs of electrodes which are formed in a matrix.

3. The display of claim 1 wherein said liquid crystal layer is made of à chiral smectic liquid crystal.

4. The display of claim 3 wherein said liquid crystal device exhibits apparent hysteresis with reference to the transmissivity of said liquid crystal layer and the applied voltage.

* * * * *